Sept. 3, 1935.                K. E. BUCK                2,013,625
                          REFRACTORY ARTICLE
                         Filed March 29, 1933

INVENTOR
Kenneth E. Buck
BY
Augustus B Stoughton
ATTORNEY.

WITNESS:

Patented Sept. 3, 1935

2,013,625

UNITED STATES PATENT OFFICE 2,013,625

REFRACTORY ARTICLE

Kenneth E. Buck, Philadelphia, Pa., assignor to Ross-Tacony Crucible Company, Philadelphia, Pa., a corporation of Pennsylvania Application March 29, 1933, Serial No. 663,259

5 Claims. (Cl. 106—9)

There are several important types of bonds for refractory articles, used to cement the refractory aggregates comprising the article together; the glass or porcelanic bond, the crystalline bond (either same or different composition as regards the aggregate) the colloidal bond (either organic or inorganic and relying on sintering or recrystallization resulting from the firing) and the coke residue bond.

The present invention is related to the last type, and has for its object the provision of a lasting protection against oxidation of such a bond, when exposed to oxygen and oxidizing conditions at the various temperatures that a refractory article so bonded may be exposed to in service.

Those skilled in the art, familiar with this type of bond, which is the residue resulting from carbonizing such materials as tar and pitch, which have previously been mixed with the refractory aggregates, know that, while a coke residue bond is almost an ideal bond from the standpoint of resistance to weakening at high temperatures and resistance to thermal shock, it has one inherent and limiting weakness; that of readily burning or oxidizing, even at low temperatures if any oxidizing influence is present.

This invention provides a reliable protection against this oxidation and permits the industry to take full advantage of the good qualities of this type of bond.

This protection is accomplished, in the course of manufacture, by uniformly incorporating in the mixture one or more inclusions of oxidizable metal, metals, alloys, metalloids or carbides of same. These metallic inclusions, if properly selected, are capable of having their oxides form a molten and viscous glass. When uniformly distributed, as a fine powder, throughout the structure of an article made from such a mixture, only those inclusions close to the outer surface of the article can be oxidized and rendered useful for forming the protective glass. When the article is put into service, it is heated and surface oxidation takes place, with the result that the metal inclusion used is oxidized, while the carbon bond likewise oxidized at the surface, goes off as a carbon dioxide gas. As an example of the function of the metal inclusions, if ferro-manganese silicon is employed, its ash formed at the surface will melt into a ferro-manganese silicate glass. This glass may be formed before more than one sixty-fourth of an inch in depth of the outer surface has burned away, and when it has formed a seal is effected and further oxidation stops. This condition leaves the remainder of the metal inclusion throughout the structure unexposed to oxidation and at service temperature they may remain completely inert in the granular form, or according to the metal used, they may reach some degree of fluidity, or if the temperature is relatively high, carbides may be formed in the case of certain metals. However, regardless of the form of protected metal inclusion, at service temperature no disturbing effect results.

Should the article be chipped or have its glass skin broken away by abrasion, upon application of heat the original glass forming operation is repeated and a new surface covering is formed, so that the life of the article is greatly prolonged.

For the sake of further description it may be said that the slag, which resembles glass, is formed on the surface of the article by the heat incident to its use and from the oxidizable metal inclusion. The melting point and hence the service temperature of the protective slag or glass is a function of the composition of the metal inclusion or inclusions employed. In addition, this may be influenced somewhat by the nature of the refractory grog or material employed, since there may be some attack by the slag, produced in service, on same. To maintain the proper protective coating, with any aggregate used, the amount of, or composition of, the metal inclusion portion may be altered. In some cases, for example, where the initial heats in service are not of sufficient temperature to fuse the surface ash of the article to a protective slag, or where the necessary temperature is arrived at too slowly with the subsequent oxidation of surface penetrating unnecessarily far, the protective glass may be developed by the manufacturer through the medium of a rapid high temperature oxidizing firing after the carbonizing burn. The temperature necessary for this is dependent on the inclusions used.

An alternative way to meet the low temperature or slow temperature gradient condition, but still employ an inclusion throughout the body of the article which when oxidized is capable of giving a protective glass at relatively high temperature is to concentrate at the surface of the article only an inclusion which when oxidized gives a protective glass at relatively low temperature, such as a blend of zinc and copper with ferrosilicon and ferromanganese silicon. The concentration can be accomplished by painting or spraying an oil suspension of same on the article or by painting the inside of the mold in which the article is made with the metal blend suspension before the article is fabricated in the mold.

In case an alloy or carbide containing no silicon is used or an individual metal is used, the ash resulting from the oxidation in service is of the basic or neutral type oxide, and since there is present no oxidized silicon or acid type oxide essential for sufficient glass or slag formation at common service temperatures, it has been found that a satisfactory protective slag is formed by the non-silicon metal ash, if when selecting the refractory grog part of the whole composition at least a portion of that part is a refractory compound containing some silicon dioxide.

Due to the fact that carbon, such as the coke bond, has very high heat conducting qualities, refractories so bonded lend themselves well to uses where rapid transfer of heat through their structure is required. Outstanding in these uses are crucibles, muffles, muffle tiles, recuperator tiles and the like. These articles naturally have their aggregate portion comprised of highly conductive aggregates such as corundum, silicon carbide, graphite. In crucibles, where great flexibility and elasticity are essential, the graphite content runs high, with silicon carbide or corundum more moderate in amount. In brick, tiles or the like where strength is important, the corundum or silicon carbide content is high with graphite low or absent entirely. For examples of satisfactory compositions, which are useful in the high heat transfer field of refractories, the following three types are given together with their average moduli of rupture taken at room temperature.

|  | #1 | #2 | #3 |
|---|---|---|---|
| Graphite (natural or artificial) | 35 | 20 | |
| Silicon carbide grain | 18 | 30 | 57 |
| Alumina-silica grain | 10 | 20 | 10 |
| Amorphous aluminum oxide | 5 | | 5 |
| Ferro-manganese silicon | 10 | 10 | 10 |
| Tar or pitch | 22 | 20 | 18 |
| Modulus of rupture (lbs. sq. in.) | 310 | 528 | 2,500+ |

A very material increase in modulus of rupture can be obtained if desired for certain special uses, by increasing the metal inclusion portion. For example, in cases of #2 body increasing the ferro-manganese-silicon percentage from 10% to 20%, at the proportionate expense of all the other materials used, raised the modulus of rupture to 1290 lbs. per sq. inch.

In uses, not requiring the high conductivity property other materials such as corundum, zircon, fused silica used as the aggregate portion make satisfactory refractory articles. In cases where these materials have replaced silicon carbide in body type #3, the following moduli of rupture result:

|  | Lbs. sq. in. |
|---|---|
| Corundum | 1310 |
| Zircon | 465 |
| Fused silica | 721 |

The various refractory aggregates, employed for any given article, according to this invention, are mixed with the metallic inclusion increment and the carbonaceous bond increment by any of the methods common to the art.

The fabrication of any article desired, is done by the usual pressing, spinning or ramming, according to the shape of the article to be made. After fabrication the ware may be immediately carbonized. This is accomplished by burying the ware in a carbonaceous powder or aggregate, such as calcined coke, petroleum coke or firesand, the whole enclosed in a container or sagger, which is placed in a kiln or furnace and fired to a temperature sufficient to drive off the volatile material from bond increment and leave behind the skeleton structure of coke residue. This temperature is usually not higher than 2200° F. The article is then ready for use, unless it is to be further treated for the special cases, previously pointed out, as regards too low temperature for thorough glass protector formation or too slow temperature gradient. It is obvious that in the normal procedure as described, the articles are delivered to the user not protected against oxidation, and that in use in service some oxidation must actually take place before the article is rendered protected against oxidation.

Among substances taken singly or in a desired combination from which satisfactory crucibles or articles can be made, mention may be made of the following: Graphite, crystalline alumina silicates, amorphous alumina silicates, crystalline aluminum oxide, amorphous aluminum oxide, crystalline silica, amorphous silica, silicon carbide (any grade) zircon, and zirconia.

Similarly among powdered metals (taken singly or in any desired combination) which are oxidizable for the repeated production of a surface slag, mention may be made of the following:

Metals. Iron or steel, manganese, magnesium, copper, lead, zinc, or the like.

Metal alloys and metalloids, ferro-manganese aluminum silicon, ferromanganese carbide, ferromanganese, ferrosilicon, ferrochrome, monel, German silver, or the like.

It is fully recognized that such materials as silicides and carbides and the like might not be properly termed metals or metallic even though they are produced in metallurgical processes. However, due to lack of generally accepted nomenclature for these substances, the expressions metal and metallic are used in this specification and these claims for convenience to signify silicides, carbides and the like, in addition to true metals, metal alloys and the like.

For organic compounds to give the desired coke residue bond after carbonizing, I may use one or more of the following: If more than one is employed, they may be in any desired proportion: Tar, pitch, resin, molasses, dextrin, glutrin or the like.

The accompanying drawing may serve to further the description and in it

Figure 1:
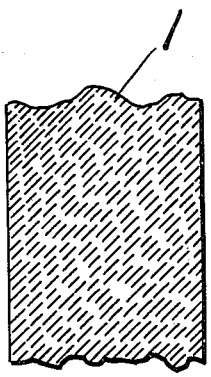
Figure 1 is a sectional view of a fragmentary part of a refractory article prior to first heating in use or preparatory for use.
Figure 2:
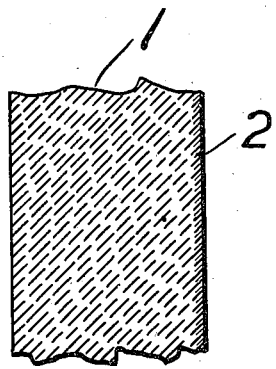
Fig. 2 is a view of the same after first heating.
Figure 3:
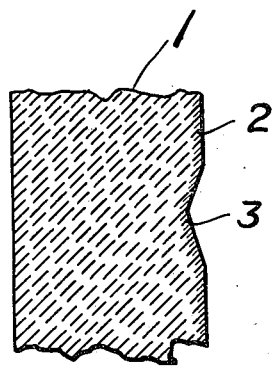
Fig. 3 is a similar view illustrating the formation of a new skin coat after chipping and reheating.

In the drawing 1 is the described substance of the article, 2 is the skin of glass, and 3 is the new skin of glass formed after chipping and again heating.

I claim:

1. A refractory article of manufacture which comprises refractory aggregates having a bond consisting of residual carbon and having dispersed throughout the refractory article a metallic substance selected from a group of substances consisting of metals, metal alloys and metalloids to provide vitreous protective coatings.

2. A refractory article of manufacture which comprises refractory aggregates having a bond consisting of residual carbon and having dispersed throughout the refractory article a manganous alloy to provide vitreous protective coatings.

3. A refractory article of manufacture which comprises refractory aggregates having a bond consisting of residual carbon and having dispersed throughout the refractory article a ferrous alloy to provide vitreous protective coatings.

4. A refractory article of manufacture which comprises refractory aggregates having a bond consisting of residual carbon and having dispersed throughout the refractory article a ferromanganese silicon to provide vitreous protective coatings.

5. A refractory article of manufacture which comprises refractory aggregates having a bond consisting of residual carbon and having dispersed throughout the refractory article silicon alloy to provide vitreous protective coatings.

KENNETH E. BUCK.